United States Patent [19]
Tsuboshima et al.

[11] 3,892,484
[45] July 1, 1975

[54] AUTOMATIC DRIVING AND CONTROL CIRCUIT FOR A MICROSCOPE STAGE OF A MICROPHOTOMETRIC APPARATUS

[75] Inventors: Kosaku Tsuboshima; Ryoichi Orimo, both of Tokyo, Japan

[73] Assignee: Olympus Optical Co., Ltd., Tokyo, Japan

[22] Filed: Aug. 13, 1973

[21] Appl. No.: 387,807

[30] Foreign Application Priority Data
Aug. 15, 1972 Japan............................ 47-81633

[52] U.S. Cl. .................. 356/96; 350/81; 350/86; 356/158; 356/167; 356/201; 356/203
[51] Int. Cl. ....................... G01j 3/42; G01m 21/22
[58] Field of Search ............ 356/83, 158, 160, 167, 356/203, 244, 96, 201; 350/81, 86, 90

[56] References Cited
UNITED STATES PATENTS
3,457,422  7/1969  Rottmann .......................... 356/167
3,780,298  12/1973  Agadzhanian et al. ............ 356/158

*Primary Examiner*—Vincent P. McGraw
*Attorney, Agent, or Firm*—Waters, Schwartz & Nissen

[57] ABSTRACT

An automatic driving and control circuit for a microscope stage mounted movably in two directions, which can automatically drive the microscope stage in the given directions. Provision is made of a detector for detecting the amount of movement of the stage and a preset means for presetting a predetermined amount of movement of the stage. When the amount of movement supplied from the detector is coincident with the amount of movement preset by the preset means, a coincidence signal is delivered to stop the stage, whereby the amount of light absorbed by substance disposed on the stage, for example, a cellular specimen is automatically measured in an accurate manner.

3 Claims, 11 Drawing Figures

FIG_1a
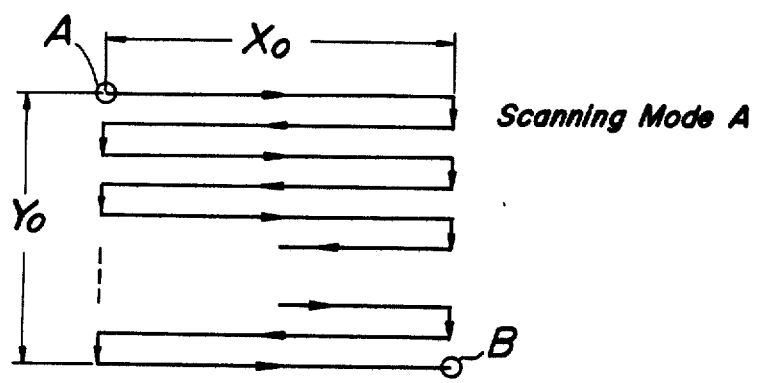
Scanning Mode A
FIG_1b
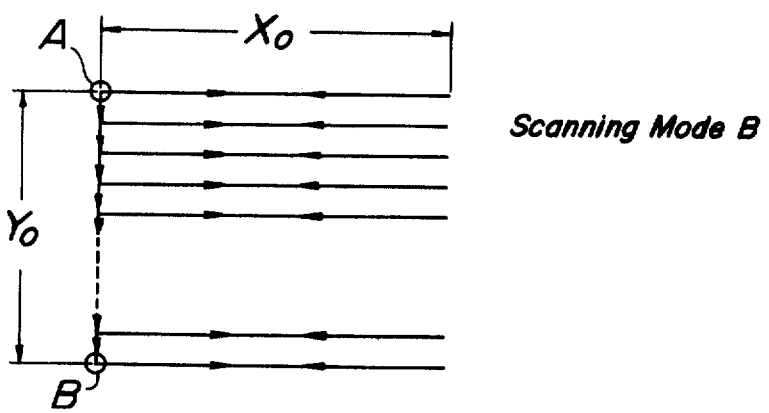
Scanning Mode B

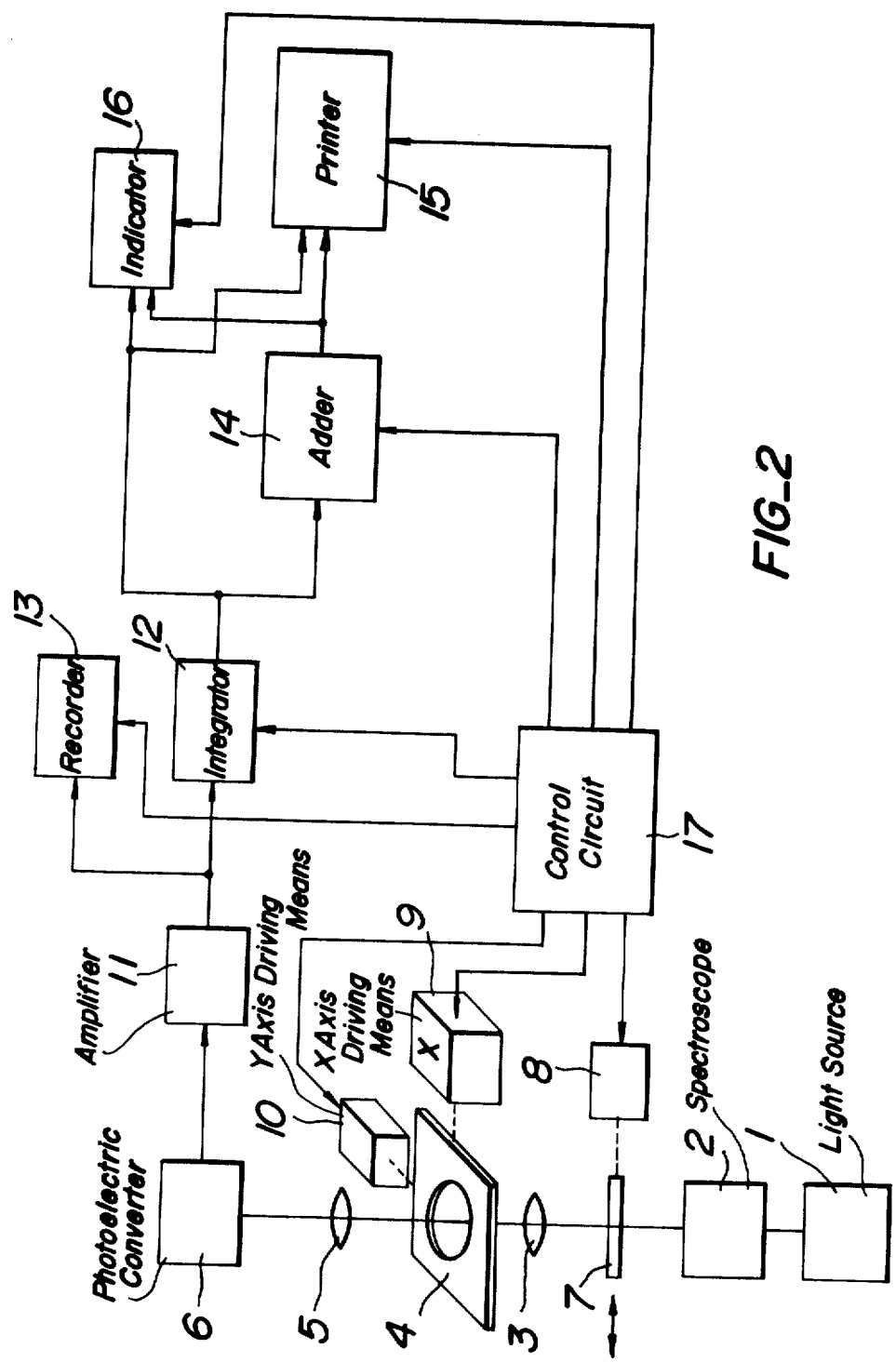
FIG_2

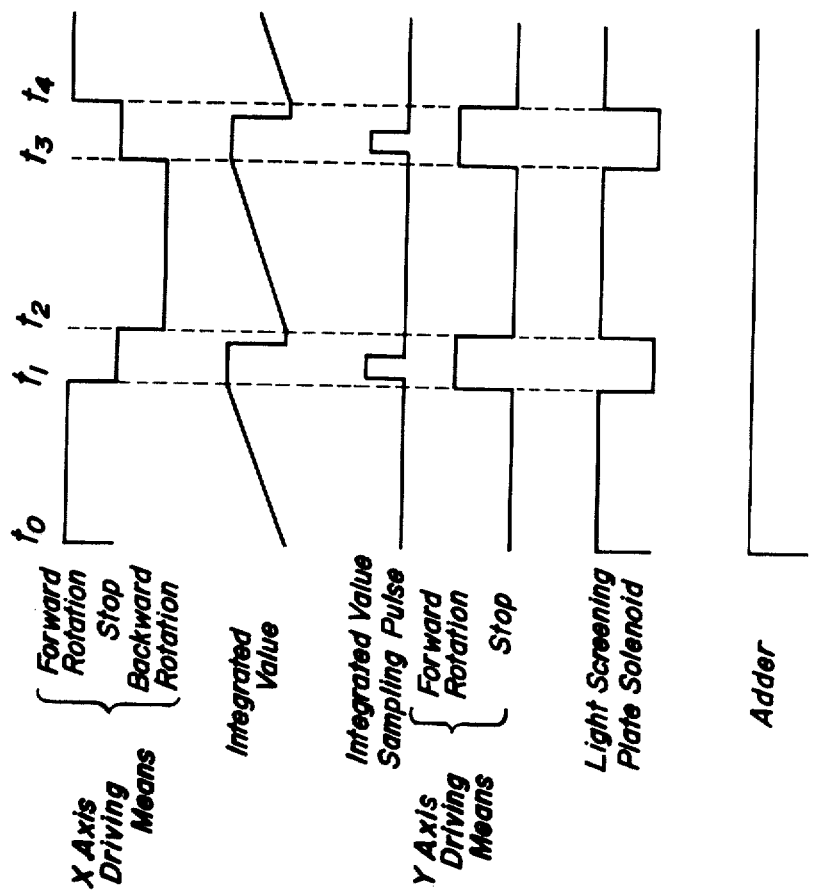
FIG_3

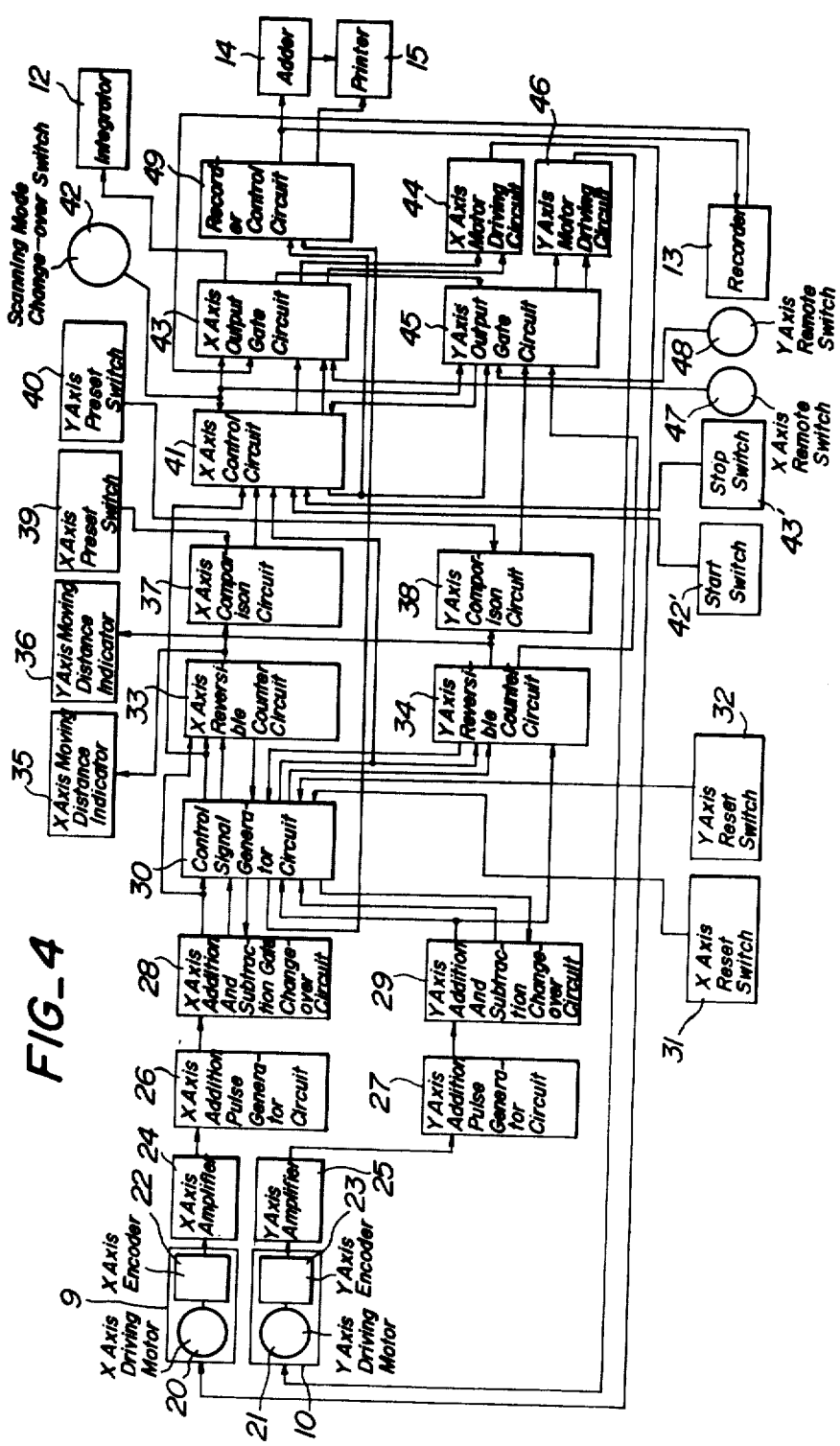
FIG_4

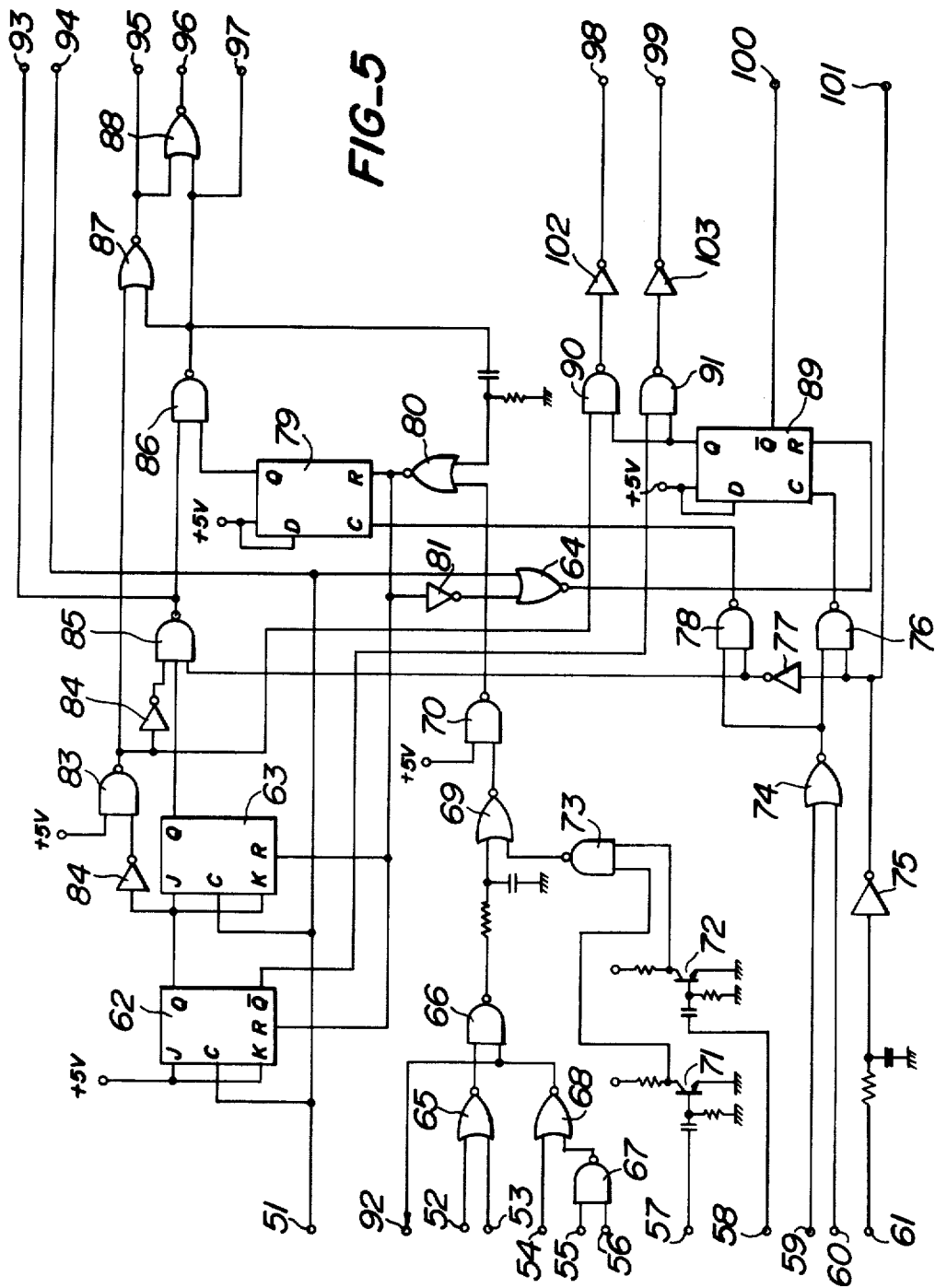
FIG._5

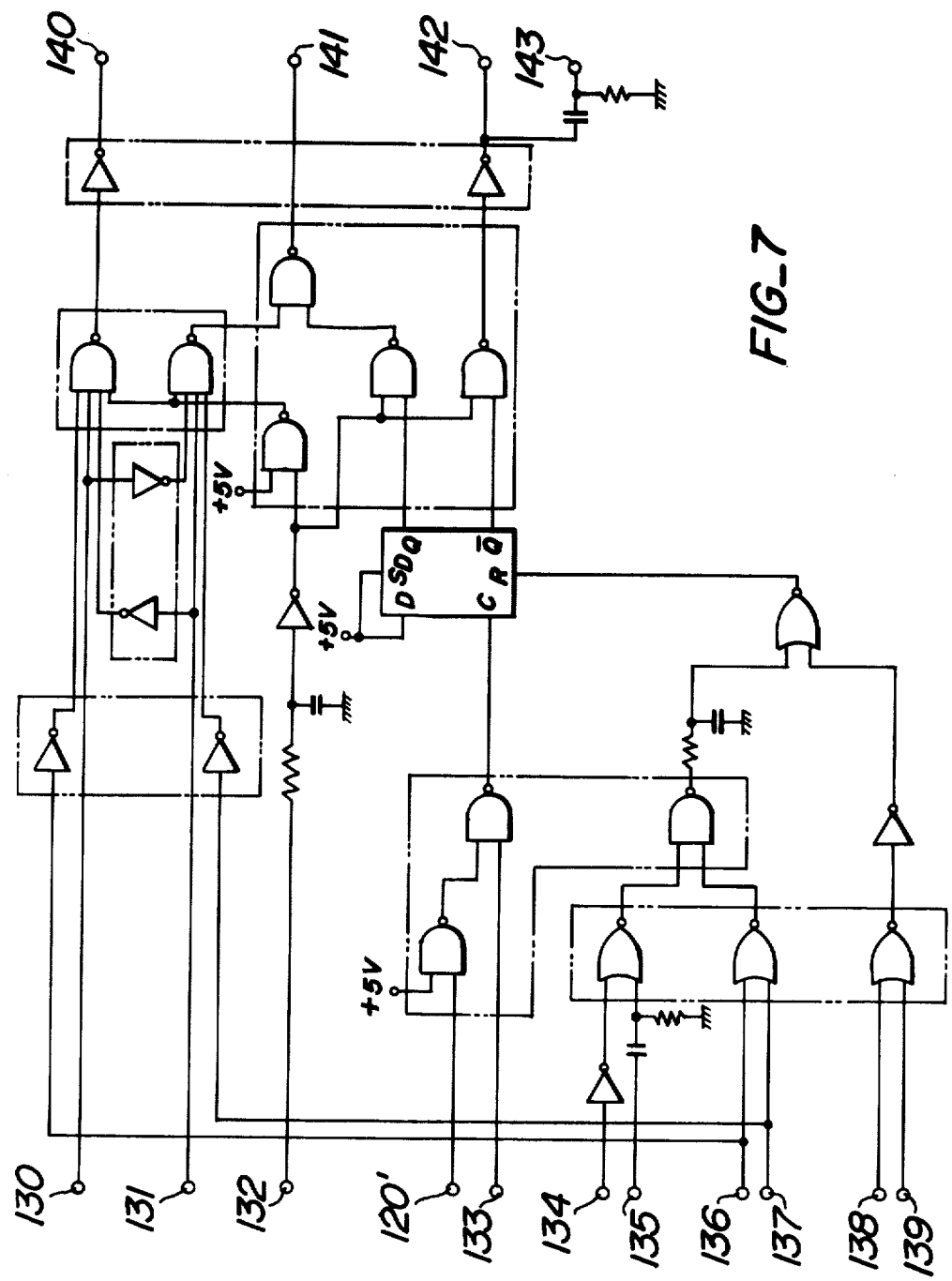
FIG._7

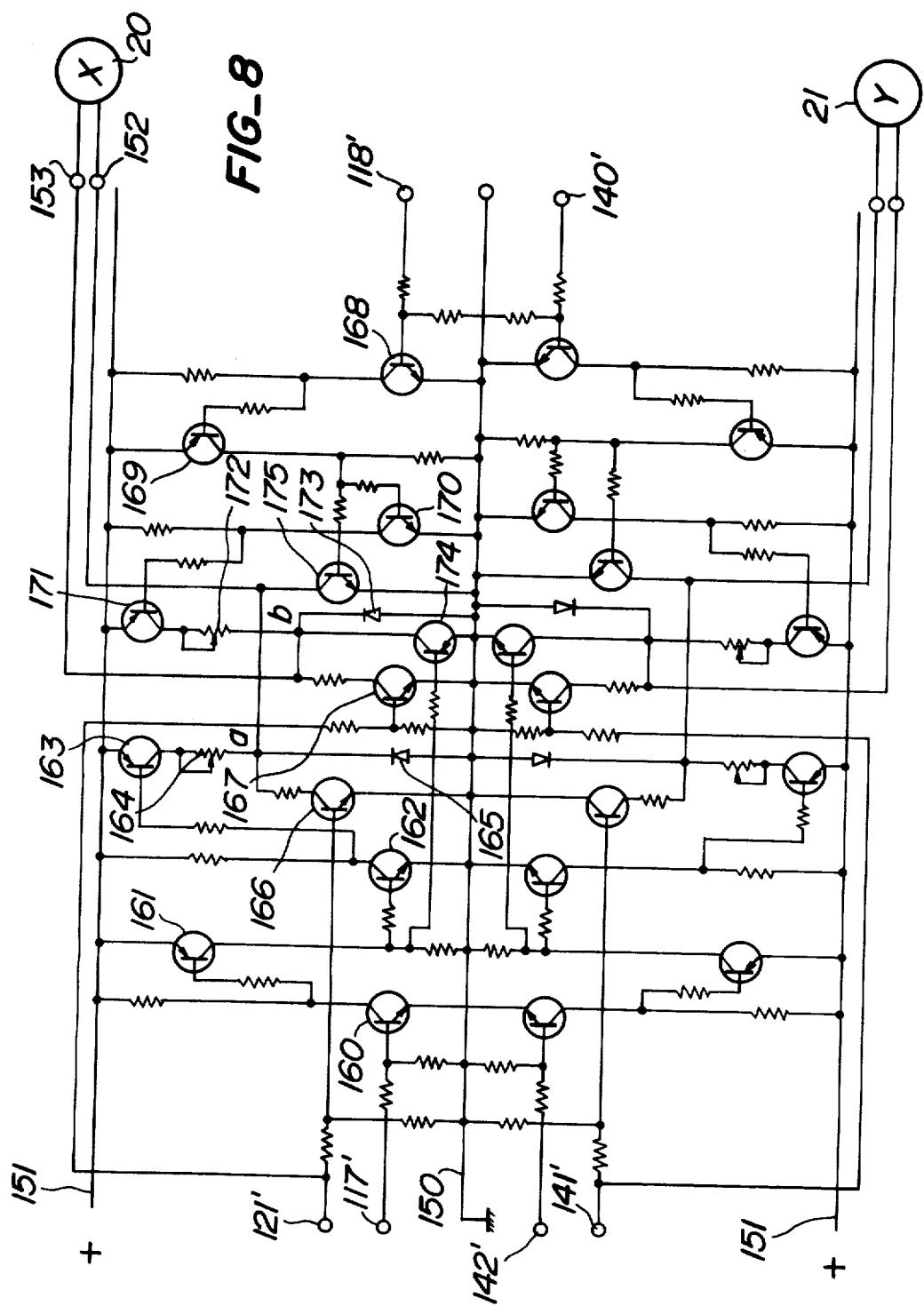
FIG_8

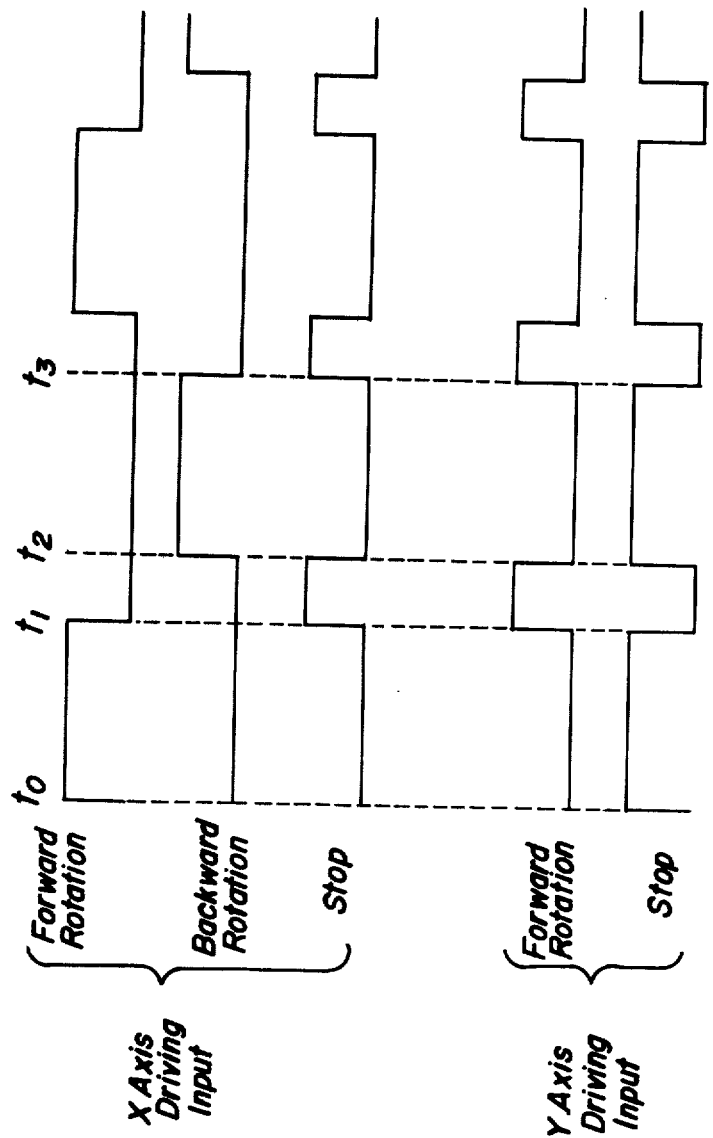
FIG_9

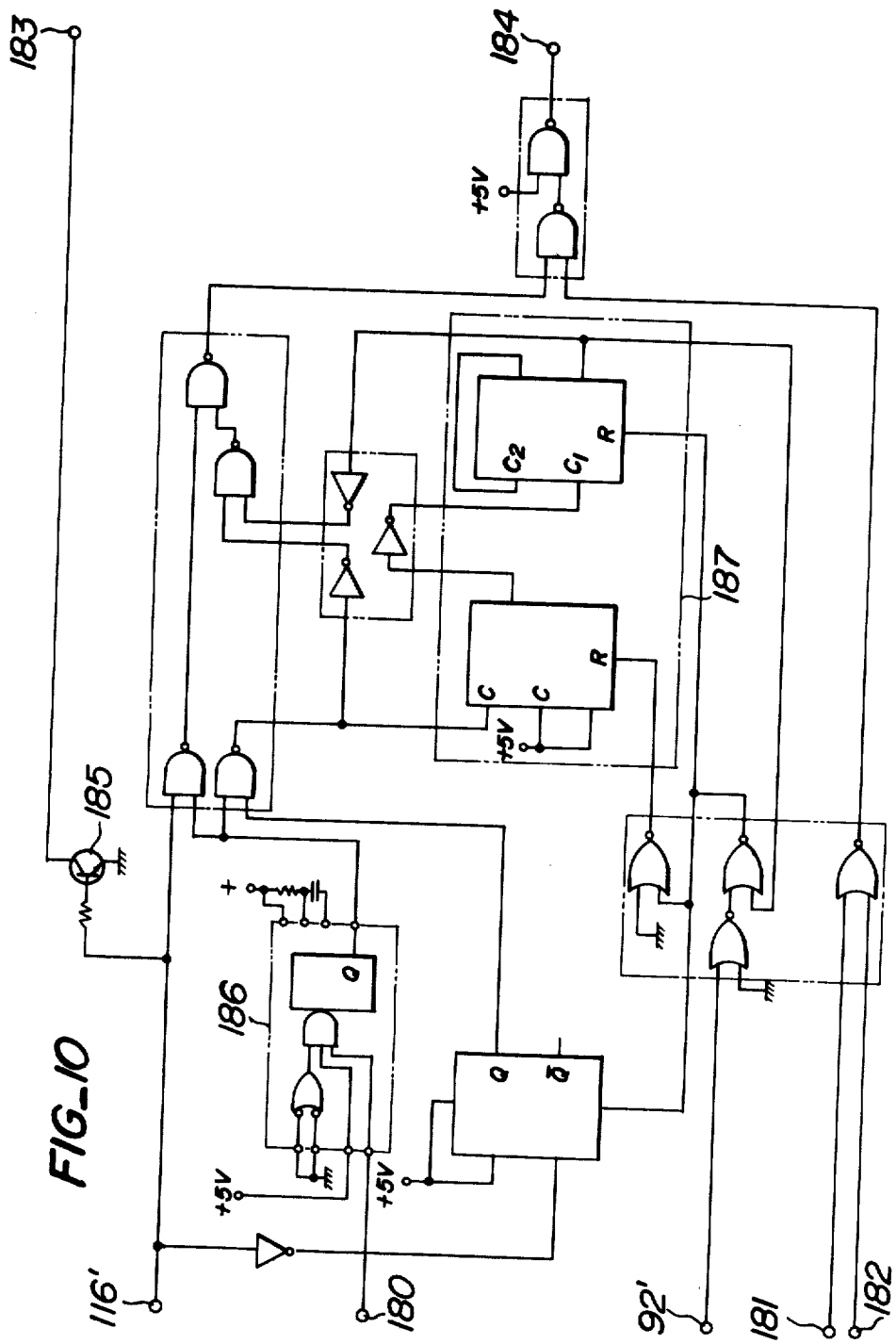
FIG_10

AUTOMATIC DRIVING AND CONTROL CIRCUIT FOR A MICROSCOPE STAGE OF A MICROPHOTOMETRIC APPARATUS

This invention relates to an automatic and control circuit for a microscope stage mounted movably in given directions, particularly, the microscope stage of a scanning and integration type microphotometric apparatus, which can automatically drive and control the microscope stage in the given directions for a given amount of movement.

Heretofore, it has been the common practice to use a microphotometric apparatus for measuring the amount of light absorbed by substance disposed on a microscope stage, for example, a cellular specimen. As such microphotometric methods, it has heretofore been proposed to use one wave length-one region method, one wave length-two regions method, two wave lengths-method, scanning and integration method, etc. Among these methods, the scanning and integration method is less erroneous and adapted to automatically measure the amount of light absorbed by the specimen. In a scanning and integration type microphotometric apparatus heretofore proposed, a light spot is made stationary and a stage on which is disposed a specimen is moved so as to be scanned by the light spot. In this case, the stage is moved along a zigzag path as shown in FIG. 1a or is moved along a combteeth shaped path as shown in FIG. 1b and use is made of a light spot whose diameter is, for example, 1 $\mu$. The stage is moved in an X direction for a distance of at most 99 $\mu$ and moved in a Y direction with a pitch of 1 $\mu$ for a distance of at most 99 $\mu$ in a manner such that the overall area of the specimen is scanned by the light spot. Any moving distance $X_0$ in the X direction and any moving distance $Y_0$ in the Y direction may suitably be chosen within the range of the above mentioned maximum value in accordance with the dimension of the specimen to be measured. In addition, the movement of the stage may be changed over from the zigzag path shown in FIG. 1a to a comb-teeth shaped path shown in FIG. 1b and vice versa. In this case, during each scanning period the photoelectrically converted output is integrated by an integrator and the integrated value thus obtained is subjected to sampling prior to starting the next scanning and then extracted. Subsequently, the integrator is reset for ready the next scanning. In addition, these operations must be controlled in association with the movement of the stage.

Even in case of microscopes for use in tools, measurements, etc. other than the above described scanning and integration type microphotometric apparatus, it has often been necessary to drive the stage in an accurate manner.

An object of the invention is to provide a control circuit which can automatically drive a microscope stage, particularly, the stage of a scanning and integration type microphotometric apparatus in an accurate manner whereby the above mentioned operations can automatically be performed.

A feature of the invention is the provision of an automatic driving and control circuit for a microscope stage mounted movably in given directions, comprising a driving means for moving said stage in the given directions, a detector for detecting the amount of movement of said stage, a preset means for presetting a predetermined amount of movement of said stage, a comparison means for comparing the amount of movement supplied from said detector with the amount of movement preset by said preset means and delivering a coincidence signal when the amount of movement supplied from said detector is coincident with the amount of movement preset by said preset means, and a control means for receiving the coincidence signal from said comparison means and stopping said driving means.

The invention will now be described with reference to the accompanying drawings, in which:

FIGS. 1a and 1b diagramatically illustrate paths along which is moved a stage of a scanning and integration type microphotometric apparatus;

FIG. 2 is a block diagram showing construction and arrangement of a scanning and integration type microphotometric apparatus to which is applied the automatic driving and control circuit for a microscope stage according to the invention;

FIG. 3 shows signal wave forms illustrating the operation of the apparatus shown in FIG. 2;

FIG. 4 is a block diagram showing one embodiment of the automatic driving and control circuit for a microscope stage according to the invention;

FIG. 5 is a circuit diagram showing one embodiment of the X axis control circuit shown in FIG. 4;

FIG. 7 is a circuit diagram showing one embodiment of the Y axis output gate circuit shown in FIG. 4;

FIG. 8 is a circuit diagram showing one embodiment of the X axis and Y axis motor driving circuits shown in FIG. 4;

FIG. 9 shows signal wave forms illustrating the operation of the circuits shown in FIG. 8; and FIG. 10 is a circuit diagram showing one embodiment of the recorder control circuit shown in FIG. 4.

Figure 6:
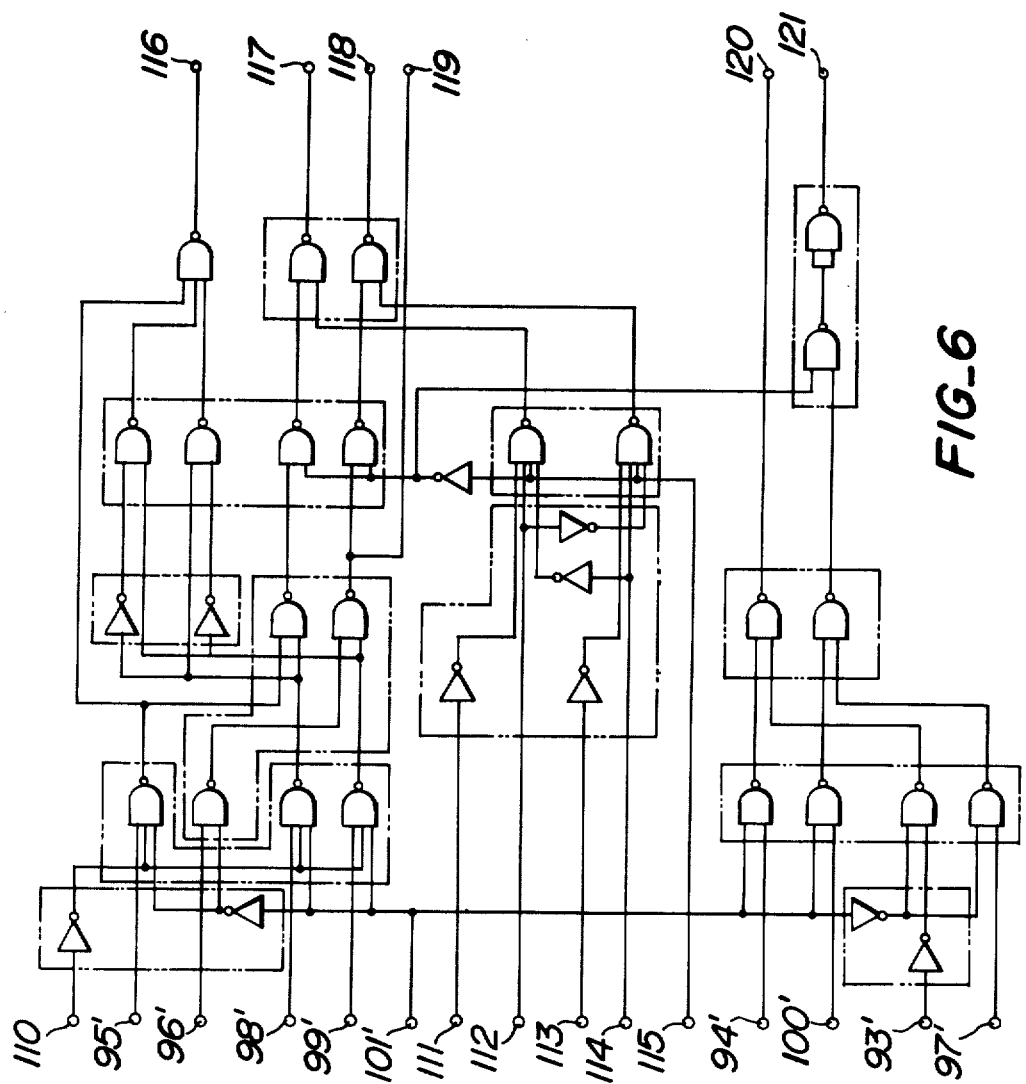
FIG. 6 is a circuit diagram showing one embodiment of the X axis output gate circuit shown in FIG. 4.

The invention will now be described in detail with reference to the accompanying drawings.

FIG. 2 shows a block diagram illustrating a scanning and integration type microphotometric apparatus to which is applied an automatic driving and control circuit for a microscope stage according to the invention. Light rays emitted from a light source 1 such as a tungsten lamp or xenon discharge lamp pass through a spectroscope 2 consisting of a filter, prism or diffraction grating and are changed into a monochromatic light which is impinged on a specimen disposed on a stage 4 as a light spot whose diameter is, for example, 1 $\mu$ by means of a condenser lens 3. The light penetrated through the specimen is collected by means of an objective lens 5 and is incident on a photoelectric converter or photoelectric multiplier 6. The light flux penetrated through the specimen is measured by the photoelectric converter 6 to generate a corresponding electric signal output.

Let the incident light flux be $I_0$ and the penetrated light flux be $I$. Then, the transmittivity T of the specimen is given by $$T = \frac{I}{I_o},$$

while the light absorptivity A is given by $$A = \log_{10} \frac{1}{T} = \log_{10} \frac{I_o}{I}.$$

Various points of the light absorptivity A which change in function with various scannings by the light spot can be plotted into a curve whose surface is integrated to obtain the amount of light absorbed by the specimen. All of these amounts of light absorbed by the specimen are added with respect to various scannings by the light spot to obtain the total amount of light absorbed by the overall specimen.

Between the spectroscope 2 and the stage 4 on which is disposed the specimen is arranged a light screening plate 7 which is inserted into and removed from the light ray path as shown by arrows by means of a solenoid 8.

In the present embodiment, the stage 4 on which is disposed the specimen is made movable in an X direction and a Y direction which is perpendicular to the X direction by X and Y axes driving means 9 and 10, respectively.

The electrical signal output from the photoelectric converter 6 is amplified by an amplifier 11 and then is supplied to an integrator 12. The output from the amplifier 11 is also supplied to a recorder 13 by which the light absorptivity curve plotted by each scanning by the light spot is recorded on a record sheet. The output from the integrator 12 is supplied to an adder 14 by which the amounts of light absorbed by the specimen are added to obtain the total amount of light absorbed by the overall specimen. The output from the adder 14 is supplied to a printer 15 to obtain a print of the total amount of light absorbed by the overall specimen. The output from the adder 14 is also supplied to an indicator 16 adapted to indicate by numerals the total amount of light absorbed by the overall specimen. To the indicator 16 is supplied the output from the integrator 12 to indicate the integrated value of the high absorptibity curve plotted by the various scannings by the light spot.

In the present invention, provision is made of a control circuit 17 which can control all of the operations of the solenoid 8, X and Y axis driving means 9, 10, integrator 12, recorder 13, adder 14, printer 15 and indicator 16 in association with each other.

The operation of microphotometric apparatus according to the invention will now be described with reference also to FIGS. 1 and 3.

The apparatus according to the invention is capable of changing over two scanning modes A and B shown in FIGS. 1a and 1b, respectively. The scanning mode A shown in FIG. 1a causes the stage 4 to move along a zigzag path and the scanning mode B shown in FIG. 1b causes the stage 4 to move along a comb-teeth shaped path.

At first, the operation of the microphotometric apparatus according to the invention in case of adopting the scanning mode A will be described. The stage 4 is moved to locate the specimens disposed thereon in the region to be scanned by the light spot. In the present embodiment, remote switches are operated to drive X and Y axis driving means 9, 10, to move the stage 4 in the X and Y axis directions, respectively. In addition, the optical system is changed over so as to illuminate the overall field of view. Then, the light spot is positioned at a starting point A shown in FIG. 1a. Then, a region to be scanned by the light spot is determined to preset a moving distances $X_0$ of the light spot in the X axis direction and a moving distance $Y_0$ of the light spot in the Y axis direction. The apparatus according to the present embodiment is capable of moving the light spot for a maximum distance of 99 $\mu$ in the X axis direction and of moving the light spot for a maximum distance of 99 $\mu$ with a pitch of 1 $\mu$ in the Y axis direction. As described above, since the diameter of the light spot is 1 $\mu$, the overall surface of the region to be scanned can be scanned by the light spot.

Then, the user turns a scanning mode change-over switch provided for the control circuit 17 to the scanning mode A to preset the above mentioned moving distances $X_0$ in the X axis direction and $Y_0$ in the Y axis direction, respectively. Then, at a time $t_0$ shown in FIG. 3 a starting button is pushed to deliver a signal from the control circuit 17 to the X axis driving means 9 which causes the stage 4 to move in the X axis direction at a constant speed of, for example, 5 $\mu$/sec. Prior to pushing the start button at the time $t_0$, the solenoid 8 is deenergized so that the light screening plate 7 is located within the light ray path. If the start button is pushed, the solenoid 8 is energized to move the light screening plate 7 out of the light ray path. If the start button is pushed, a signal is also delivered from the control circuit 17 to the integrator 12. Thus, the integrator 12 is operated to integrate the electric signal output produced by the photoelectric converter 6 and amplified by the amplifier 11.

If the stage 4 moves for the distance $X_0$, at a time $t_1$ a stopping signal is delivered from the control circuit 17 to the X axis direction driving means 9 to stop the movement of the stage 4 and denergize the solenoid 8, thereby moving the light screening plate 7 toward the light ray path. At the same time, a signal is delivered from the control circuit 17 to the integrator 12 to stop its integrating operation and keep its integrated value. In addition, a signal is delivered from the control circuit 17 to the Y axis driving means 10 to move the stage 4 in the Y direction.

While the integrator 12 maintains its integrated value, a sampling pulse is delivered from the control circuit 17 to the integrator 12 to deliver the integrated value kept in the integrator 12 to the adder 14. If necessary, the output from the adder 14 may be delivered to the printer 15 so as to print the output from the adder 14 and to the indicator 16 so as to indicate the output from the adder 14. After the integrated value has been sampled, a reset signal is delivered from the control circuit 17 to the integrator 12 to reset it.

If the stage 4 is moved for a distance 1 $\mu$ in the Y axis direction, at a time $t_2$ a signal is delivered from the control circuit 17 to the Y axis driving means 10 to stop the movement of the stage 4, and as a result, the scanning and integrating operations along one scanning line is completed.

At the time $t_2$, a signal is delivered from the control circuit 17 to the X driving means 9 which causes the stage 5 to move in a direction opposite to the preceding direction along the X axis at a given speed. At the time $t_2$, the solenoid 8 is energized again to move the light screening plate 7 out of the light ray path. The integrating operation along the next scanning line is performed in the above described manner. Similar scanning and integrating operations will be effected as shown in FIG. 1a to apply the integrated values obtained by the successive scannings, i.e., the amount of light absorbed by the specimen to the adder 14. If the final scanning is completed, the total sum of the integrated values obtained by all of the scannings is generated at the adder 14. This total sum represents the total amount of light absorbed by the overall specimen. This amount of light absorbed by the specimen is delivered to the printer 15 so as to print it and to the indicator 16 so as to indicate it. At last, a signal is delivered from the control circuit 17 to the adder 14 to reset it.

As shown in FIG. 2, the output from the amplifier 11 is also supplied to a recorder 13 which can plot a curve showing the amount of light absorbed by the specimen on a recording sheet. The operations of the recorder 13, printer 15, and indicator 16 may be controlled in association with the successive scannings by means of the control circuit 17.

The scanning mode B shown in FIG. 1b will now be described. The operation of the scanning mode B is easily understood if referred to the above described scanning mode A, so that the operation of the scanning mode B will briefly be described. In the scanning mode B, the integration is effected while the stage 4 is moved in a positive direction along the X axis. The light screening plate 7 is positioned in the light ray path while the stage 4 is returned along the same scanning passage to effect the sampling of the integrated value which is delivered to the adder 14. As above described, the scanning and integrating operations are effected in one direction only so that the various curves showing the amount of light absorbed by the specimen and recorded by the recorder 13 are aligned in their directions. On the contrary, in the above described scanning mode A, the various curves showing the amount of light absorbed by the specimen and recorded by the recorder 13 are opposite in their directions to each of the adjacent scanning lines. But, the output from the integrator 12 and hence the output from the adder 14 are the same both in the scanning mode A and in the scanning mode B.

In FIG. 4 is shown the control circuit 17 for controlling various parts of the scanning and integration type microphotometric apparatus in association each other in detail. In the present embodiment, each of the X axis driving means 9 and Y axis driving means 10 comprises a DC motor, encorder and feeding screw whose amount of movement and hence the amount of movement of the stage 4 is treated by a pulse signal from the encoder to obtain such amount of movement as counts. In FIG. 4, reference numerals 20 and 21 designate X axis driving DC motor and Y axis driving DC motor provided for the X axis driving means 9 and Y axis driving means 10, respectively. 22 and 23 show X axis encoder and Y axis encoder, respectively. The outputs from the encoders 22, 23 are amplified by X axis and Y axis amplifiers 24, 25 and after shaping their wave forms are delivered to X axis and Y axis addition and subtraction pulse generating circuits 26 and 27, respectively. In these X axis and Y axis addition and subtraction pulse generating circuits 26, 27, from two square waves whose phases are different by 90° each other are generated four addition and subtraction output pulses during one period of time. In the present embodiment, a square wave at one period is generated while the stage 4 is moved for 1 $\mu$ so that 4 output pulses correspond to 1 $\mu$ and 1 output pulse corresponds to ¼ $\mu$. The above described encoders 22, 23, X axis and Y axis amplifiers 24, 25 and X axis and Y axis addition and subtraction pulse generating circuits 26, 27 may be of those well known in the art so that a further description thereof is omitted.

The addition and subtraction output pulses from the X axis and Y axis addition and subtraction pulse generating circuits 26 and 27 are delivered to X axis and Y axis addition and subtraction gate change-over circuits 28 and 29, respectively. These X axis and Y axis addition and subtraction gate change-over circuits 28 and 29 detect whether the addition and subtraction pulses delivered from the X axis and Y axis addition and subtraction pulse generating circuits 26 and 27 are an addition pulse or a subtraction pulse, and deliver an addition and subtraction gate signal and output count pulse, respectively. The addition and subtraction gate signal and the output count pulse delivered from these X axis and Y axis addition and subtraction gate change-over circuits 28 and 29 are supplied to a control signal generator circuit 30.

The control signal generator circuit 30 is provided with a reversible counter of arbitrary number 4 adapted to generate 1 count pulse when 4 output count pulses are delivered from the X axis and Y axis addition and subtraction gate change-over circuits 28 and 29. Thus, 1 count pulse corresponds to the amount of movement for 1 $\mu$. This count pulse is counted by a reversible counter circuit to be described later.

The control circuit is further provided with an X axis reset switch 31 and Y axis reset switch 32 connected to the control signal generator circuit 30 and adapted to deliver X axis and Y axis reset signals when these X axis and Y axis reset switches 31, 32 are pushed.

The count pulses delivered from the control signal generator circuit 30 are supplied X axis and Y axis reversible counter circuits 33 and 34, respectively. To the addition and subtraction change-over input terminals of these X axis and Y axis reversible counter circuits 33 and 34 are supplied the addition and subtraction gate signals from the above mentioned X axis and Y axis addition and subtraction gate change-over circuits 28 and 29, respectively, to change over the addition and the subtraction of the X axis and Y axis reversible counter circuits 33 and 34. The output from the X axis reversible counter circuit 33 is delivered to an X axis moving distance indicator 35 to numerically indicate the amount of movement of the stage 4 in the X direction. This numerical value represents the moving distance of the stage 4 in the X axis direction in unit of 1 $\mu$. Similarly, the output from the Y axis reversible counter circuit 34 is delivered to a Y axis moving distance indicator 36 to indicate the amount of movement in the Y axis direction of the stage 4 by 1 $\mu$ unit. In the present embodiment, the outputs from the X axis and Y axis reversible counter circuits 33 and 34 represent 4 bit signals of a binary coded decimal code (hereinafter abbreviated as BCD) and the indicators 35 and 36 indicate 2 units of the decimal system.

The outputs from the X axis and Y axis reversible counter circuits 33 and 34 are delivered to X axis and y axis comparison circuits 37 and 38, respectively. To these X axis and Y axis comparison circuits 37 and 38 are supplied preset signals of 4 bits of the BCD code from X axis preset switch 39 and Y preset switch 40, respectively. The X axis and Y axis comparison circuits 37, 38 compare the count outputs of 4 bits from the X axis and Y axis reversible counter circuits 33, 34 with the preset values of 4 bits from the preset switches 39, 40 to generate a coincidence signal when the count outputs are coincident with the preset values.

The coincidence output signal from the X axis comparison circuit 37 is delivered to an X axis control circuit 41. Provision is made of a start switch 42' and a stop switch 43' connected to the X axis control circuit 41, respectively. The X axis reset signal generated by the above mentioned control signal generator circuit 30 is supplied to the X axis reversible counter circuit 33 and to the X axis control circuit 41, while the Y axis reset signal generated by the control signal generator circuit 30 is supplied to the Y axis reversible counter circuit 34 and to the X axis control circuit 41. In addition, provision is made of a scanning mode change-over switch 42 connected to the X axis control circuit 41. The X axis control circuit 41 is adapted to generate forward rotating signal, backward rotating signal and stop signal with respect to the X axis driving motor 20 in accordance with the scanning mode defined by the scanning mode change-over switch 42. These signals are supplied to an X axis output gate circuit 43 connected to the above mentioned scanning mode change-over switch 42.

The X axis output gate circuit 43 is adapted to generate forward rotating signal, backward rotating signal and stop signal with respect to the X axis driving motor 20, generate a Y axis start signal with respect to the Y axis driving motor 21 and generate an integrated value sampling signal. The forward rotating signal, backward rotating signal and stop signal with respect to the X axis driving motor 20 are supplied to an X axis motor driving circuit 44 and the Y axis start signal is supplied to a Y axis output gate circuit 45. To this Y axis output gate circuit 45 are supplied 1 μ step stop signal from the Y axis reversible counter circuit 34 and supplied the coincidence output signal from the Y axis comparison circuit 38. The Y axis output gate circuit 45 is adapted to generate a forward rotating signal, backward rotating signal and stop signal with respect to the Y axis driving motor 21 and generate an X axis start signal with respect to the X axis driving motor 20. The forward rotating signal, backward rotating signal and stop signal with respect to the Y axis are supplied to a Y axis motor driving circuit 46 and the X axis start signal is supplied to the X axis output gate circuit 43.

Provision is made of X axis and Y axis remote switches 47 and 48 in order to move the stage 4 at will. These X axis and Y axis remote switches 47 and 48 are connected to the X axis output gate circuit 43 and the Y axis output gate circuit 45, respectively. The X axis and Y axis remote switches 47 and 48 are provided with forward rotating position, backward rotating position and stop position, respectively, and adapted to remotely control the stage 4 at will. In order to change over the automatic control to the remote control and vice versa, provision is made of a scanning mode change-over switch 42 with a remote change-over contact connected to the X axis and Y axis output gate circuits 43, 45, therey changing over the automatic control to the remote control and vice versa.

The X axis and Y axis motor driving circuits 44 and 46 are connected to the X axis and Y axis driving motors 20 and 21, respectively. In addition, the reset signal and stop signal produced at the X axis control circuit 41 are supplied to the Y axis output gate circuit 45 and to a recorder control circuit 49. To this recorder control circuit 49 is supplied a recording pulse from the control signal generator circuit 30. This recording pulse is the same as the count pulse delivered from the control signal generator circuit 30 to the X axis reversibles counter circuit 33. A pulse for driving a pulse motor for feeding a record sheet and a signal for controlling a relay for raising and lowering a recording pen are delivered from the recorder control circuit 49 to the recorder 13.

The output from the control signal generator circuit 30 becomes zero when the content of the X axis and Y axis reversible counter circuits 33, 34 is zero. The control signal generator circuit 30 receives the zero output from the X axis or Y axis reversible counter circuit 33 or 34 and supplied the zero output to the X axis and Y axis addition and subtraction gate change-over circuits 28, 29 when the content of its 4 bits counter becomes zero. The X axis and Y axis addition and subtraction gate change-over circuits 28, 29 upon receipt of the zero output change over the addition and subtraction gate signal from the addition to the subtraction and vice versa. As described above, the X axis and Y axis reversible counter circuits 33, 34 can accurately count in the order of — 3, 2, 1, 0, -1, -2 —.

In FIG. 5 is shown one embodiment of the axis control circuit 41 in detail. The X axis control circuit 41 of the present embodiment is provided with 11 input terminals 51 to 61. The input terminals 51 is adapted to receive the coincidence signal from the X axis comparison circuit 37. This coincidence signal becomes a high logic level "1" when the content of the X axis reversible counter circuit 33 is coincident with a value preset by X axis preset switch 39. The input terminals 52, 53 are connected to a pair of limit switches for defining the maximum amount of movement of the stage 4 along the X axis is positive and negative directions. These limit switches are capable of controlling the upper and lower limits of the movement of the stage 4 in the X direction, and as a result, the stage 4 could not move beyond these limits. The input terminal 54 is connected to the stop switch 43'. If the stop switch 43' is pushed, 1 signal is applied to the input terminal 54. To the input terminals 55 and 56 are supplied the X axis reset pulse and Y axis reset pulse produced by the control signal generator circuit 30 when the X ais and Y axis reset switches 31 and 32 are pushed, respectively. These reset pulses become low logic signal, that is, "0" signal when the reset switches 31, 32 are pushed. The input terminals 57, 58 are adapted to receive the switch change-over signal for resetting the control circuit for the purpose of preventing an erroneous operation of the apparatus due to the noise produced when the scanning mode change-over switch 42 is operated. The input terminal 59 is adapted to receive the X axis start signal delivered from the Y axis output gate circuit 45. The input terminal 60 is connected to the start switch 42' and adapted to receive a start signal (1 signal). The input signal 61 is connected to the scanning mode change-over switch 42 and adapted to receive 1 signal or 0 signal in response to the scanning modes. In the present embodiment, the mode change-over signal is 0 for the scanning mode A and is 1 for the scanning mode B.

The input terminal 51 for receiving the coincidence signal is connected to clock input terminals C of flip-flops 62 and 63 constituting a direction determining counter and to an input terminal of an NOR gate 64. The input terminals 52 and 53 connected to the limit switch are connected to an NOR gate 65 whose output terminal is connected to an NAND gate 66. In addition, the input terminals 55 and 56 adapted to receive the X axis and Y axis reset signals are connected to input terminals of an NAND gate 67 whose output terminal is connected to an NOR gate 68. The other input terminal of the NOR gate 68 is connected to the input terminal 54 connected to the stop switch 43' and to the output terminal of the NOR gate 68 is connected the other input terminal of the NAND gate 66 whose output terminal is connected to one of input terminals of an NOR gate 69 of which output terminal is connected to one of input terminals of an NAND gate 70. To the other input terminal of the NAND gate 70 is always applied 1 signal of +5 V. The input terminals 57 and 58 are connected to bases of transistors 71 and 72, respectively, whose collectors are connected to input terminals of an NAND gate 73. The output terminal of the NAND gate 73 is connected to the input terminal of the NOR gate 69. The input terminals 59 and 60 are connected to the input terminals of an NOR gate 74 and the input terminal 61 is connected to an inversion stage 75. The output terminals of the NOR gate 74 and of the inversion stage 75 are connected to the input terminals of an NAND gate 76. The output terminal of the NOR gate 74 is also connected to the input terminal of an NAND gate 78 and the output terminal of the inversion stage 75 is also connected through an inversion stage 77 to the input terminal of the NAND gate 78.

The output terminal of the NAND gate 78 is connected to the clock input terminal of a flip-flop 79. The output terminal of the NAND gate 70 is connected to the input terminal of an NOR gate 80 whose output terminal is connected to the reset input terminals R of the flip-flops 62, 63, 79. In addition, the output terminal of the NOR gate 80 is also connected through an inversion state 81 to the input terminal of the NOR gate 64.

The Q output terminal of the flip-flop 62 is connected to the J input terminal of the flip-flop 63 and through an inversion stage 82 to one of the input terminals of an NAND gate 83, to the other input terminal of which being always applied +5V.

The output terminal of the NAND gate 83 is connected through an inversion stage 84 to one of the input terminals of an NAND gate 85, whose two other input terminals are connected to the Q output terminal of the flip-flop 63 and to the output terminal of the inversion stage 77, respectively. The output terminal of the NAND gate 85 and the Q output terminal of the flip-flop 79 are connected to the input terminals of an NAND gate 86, respectively, whose output terminal is connected to the input terminals of NOR gates 87 and 88. The other input terminal of the NOR gate 87 is connected to the output terminal of the NAND gate 83 and the other input terminal of the NOR gate 88 is connected to the output terminal of the NOR gate 87.

The output terminal of the NAND gate 76 is connected to the clock input terminal C of a flip-flop 89 and the output terminal of the NOR gate 64 is connected to the reset input terminal R of the flip-flop 89. The Q output terminal of the flip-flop 89 is connected to input terminals of NAND gates 90 and 91. The other input terminal of the NAND gate 90 is connected to the output terminal of the NAND gate 83 and the other input terminal of the NAND gate 91 is connected to the $\overline{Q}$ output terminal of the flip-flop 62.

The X axis control circuit 41 of the present embodiment is provided with ten output terminals 92 to 101. The output terminal 92 is connected to the output terminal of the NOR gate 68. This output terminal 92 is adapted to deliver a reset signal to the Y axis output gate circuit 45. The output terminal 93 is connected to the output terminal of the NAND gate 85. This output terminal 93 is adapted to supply the Y axis start signal to the Y axis output gate circuit 45. The output terminal 94 is connected to the input terminal 51, and as a result, this output terminal 94 is adapted to supply the X axis coincidence signal to the Y axis output gate circuit 45. The output terminal 95 is connected to the output terminal of the NOR gate 87, the output terminal 96 is connected to the output terminal of the NOR gate 88 and the output terminal 97 is connected to the output terminal of the NAND gate 86. These output terminals 95, 96 and 97 are adapted to supply the forward rotating signal, backward rotating signal and stop signal with respect to the X axis driving motor 20 and to the X axis output gate circuit 43, respectively. The output terminals 98 and 99 are connected through inversion stages 102 and 103 to the output terminals of the NAND gates 90 and 91, respectively. The output terminal 100 is connected to the $\overline{Q}$ output terminal of the flip-flop 89. In addition, the output terminal 101 is connected to the output terminal of the inversion stages 75. As a result, to this output terminal 101 is supplied a negative signal of the scanning mode change-over signal.

The X axis control circuit 41 will operate as follows.

At first, let it be assumed that to all of the input terminals 52, 53, 54, 57 and 58 is applied 0 signal and to the input terminals 55 and 56 is applied 1 signal. As a result, the output of the NOR gate 65 becomes 1, the output of the NAND gate 67 becomes 0, the output of the NOR gate 68 becomes 1 and the output of the NAND gate 66 becomes 0. Both the transistors 71 and 72 become nonconductive so that the output of the NAND gate 73 becomes 0. Thus, the output of the NOR gate 69 becomes 1, the output of the NAND gate 70 becomes 0 and the output of the NOR gate 80 becomes 1 which causes the flip-flops 62, 63 and 79 to reset, thereby rendering the X axis control circuit 41 ready for operation.

Now, the scanning mode is changed over from the scanning mode A shown in FIG. 1a to the scanning mode B shown in FIG. 1b. For this purpose, to the input terminal 61 is applied 1 signal, and as a result, the output of the inversion stage 75 becomes 0. In this condition, if the start switch 42' is pushed, 1 is applied to the input terminal 60. To the input terminal 59 is applied 0 so that the output of the NOR gate 74 is changed over from 1 to 0 and the output of the NAND gate 78 is changed over from 0 to 1 to set the flip-flop 79 from whose output terminal Q is delivered 1 signal. The flip-flops 62 and 63 have been reset as described above so that the output of the inversion stage 82 is 1, the output of the NAND gate 83 is 0, and the output of the inversion 84 is 1. As a result, the output of the NAND gate 85 becomes 1, the output of the NAND gate 86 becomes 0, the output of the NOR gate 87 becomes 1 and the output of the NOR gate 88 becomes 0. Thus, from the output terminal 95 is delivered 1 signal for forward rotating the X axis driving motor 20, while the outputs from the output terminals 96 and 97 for supplying the backward rotating signal and the stop signal become 0, respectively.

If the stage 4 is moved in the positibe direction along the X axis for a distance preset beforehand by means of the X axis preset switch 39, the coincidence signal is delivered from the X axis comparison circuit 37 to the input terminal 51 to set the flip-flop 62 which delivers from its Q output terminal 1 signal. As a result, the output of the NAND gate 83 is changed into 1, the output of the NOR gate 87 is changed into 0 and the output of the NOR gate 88 is changed into 1, and as a result, the backward rotating signal is supplied from the output terminal 96.

If the stage 4 is moved in the negative direction along the X axis for a given distance, the coincidence signal is again supplied to the input terminal 51 to set the flip-flop 63. Thus, 1 signal is delivered from the output terminal Q of the flip-flop 63 and the output terminal Q of the flip-flop 62 is changed to supply 0 signal. Thus, the output of the NAND gate 83 becomes, 0, the output of the NAND gate 85 becomes 0, the output of the NAND gate 86 becomes 1, and the outputs of the NOR gates 87 and 88 become 0, and as a result, from the output terminal 97 is supplied the X axis driving motor stop signal. At the same time, the Y axis start signal is delivered from the output terminal 93. If the output from the NAND gate 86 becomes 1, the output from the NOR gate 80 becomes 0 to reset the flip-flops 62, 63 and 79.

Next, if the stage 4 has been moved in the positive direction along the X axis for a predetermined distance which is 1 $\mu$ in the present embodiment, the X axis start signal is supplied from the Y axis output gate circuit 45 to the input terminal 60. As a result, the output from the NOR gate 74 becomes 0 and the output from the NAND gate 78 becomes 1 to set again the flip-flop 79, thereby performing the above described operation. Thus, the signals for moving the stage 4 is succession along the comb-teeth shaped path as shown in FIG. 1b can be produced.

Next, the scanning mode A shown in FIG. 1a will be described. In this case, to the input terminal 61 is applied 0 signal and the output of the inversion stage 75 becomes 1 and the output of the inversion stage 77 becomes 0. If the X axis start signal is supplied to the input terminal 60, the output of the NOR gate 74 becomes 0, the output of the NAND gate 76 becomes 1 and the output from the NAND gate 78 becomes 1 to set the flip-flop 89 thereby making its Q output 1 and making its $\overline{Q}$ output 0. The flip-flop 62 is reset to make its Q output 0 and its $\overline{Q}$ output 1, so that the output from the NAND gate 90 becomes 1 and the output from the NAND gate 91 becomes 0 and hence the output from the inversion stage 102 becomes 0 and the output from the inversion stage 103 becomes 1. As a result, the output terminal 99 for supplying the backward rotating signal can deliver 0 signal, the output terminal 99 for supplying the forward rotating signal can deliver 1 signal and the output terminal 100 for supplying the stop signal can deliver 0 signal.

If the stage 5 has been moved in the positive direction along the X axis for the distance preset, the coincidence signal is supplied to the input terminal 51 to set the flip-flop 62 and to make the output from the NOR gate 64 0, thereby resetting the flip-flop 89 and making its Q output 0 and making its $\overline{Q}$ output 1. In addition, the output from the NAND gate 90 becomes 1, the output from the NAND gate 91 becomes 1, and the outputs from the inversion stages 102 and 103 become 0, respectively. As a result, the forward and backward rotating signals with respect to the X axis driving motor 20 become 0 and the stop signal becomes 1.

If the stage 4 has been moved in the positive direction along the Y axis for 1 $\mu$, to the input terminal 59 is supplied X axis start signal to set the flip-flop 89 so that the output from the NAND gate 90 becomes 0, the output from the NAND gate 91 becomes 1, the output from the inversion stage 102 becomes 1 and the output from the inversion stage 103 becomes 0. As a result, from the output terminal 98 is delivered the backward rotating signal and from the output terminals 99 and 100 is delivered 0 signal.

If the stage 4 has been moved in the negative direction along the X axis for a predetermined distance, to the input terminal 51 is supplied again the coincidence signal to reset the flip-flop 89, whereby the outputs from the NAND gates 90 and 91 become 1 and the outputs from the inversion stages 102 and 103 become 0.

Operations similar to the above operations will be repeated in succession so as to cause the stage 4 to move along the zigzag path as shown in FIG. 1a.

In FIG. 6 is shown one embodiment of the X axis output gate circuit 43 shown in FIG. 4. The X axis output gate circuit 43 is connected to that stage which succeeds to the X axis control circuit 41 as shown in FIG. 4. These input terminals of the X axis output gate circuit shown in FIG. 6 which are connected to the output terminals of the above mentioned X axis control circuit 41 are designated by the same reference numerals but each added with dash mark. The present X axis output gate circuit 43 is provided with fifteen input terminals of which nine input terminals 93' to 101' are connected to the output terminals 93 and 101 of the above mentioned X axis control circuit 41, respectively. The input terminal 110 is adapted to receive an inhibit signal which can inhibit the movement of the stage 4 during that time which is required to treat the integrated value. In the present embodiment, the inhibit signal is supplied to the input terminal 110 when the Y axis movement is shifted to the X axis movement. The input terminal 111 is connected to the X axis positive direction limit switch and adapted to deliver 1 signal when the stage 4 is moved to the X axis positive direction limit value at which the stage 4 is struck against the limit switch. The input terminal 112 is adapted to receive 1 signal when the X axis remote switch 47 is brought into the forward rotating side. The input terminals 113 and 114 are connected to the X axis negative direction limit switch and the X axis remote switch reversing contact, respectively. In addition, the input terminal 115 is connected to the remote change-over contact of the scanning mode change-over switch 42.

The present X axis output gate circuit 43 is provided with six output terminals 116 to 121. The output terminal 116 is adapted to deliver the integrated value sampling pulse. The output terminals 117 and 118 are adapted to deliver the forward rotating signal and the backward rotating signal with respect to the X axis driving motor 20, respectively. The output terminal 119 is adapted to deliver the backward rotating signal. The output signal 120 is adapted to deliver the Y axis start signal. The output terminal 121 is adapted to deliver the X axis stop signal. The operation of the X axis output gate circuit 43 will clearly be understood if referred to FIG. 6 so that further description thereof is omitted.

In FIG. 7 is shown one embodiment of the Y axis output gate circuit 45 shown in FIG. 4. The present Y axis output gate circuit 45 is provided with 11 input terminals. The input terminal 120' is connected to the output terminal 120 of the above mentioned X axis output gate circuit 43 and adapted to receive the Y axis start signal. The input terminals 130 and 131 are connected to the backward rotating contact and the forward rotating contact of the Y axis remote switch 48, respectively. The input terminal 132 is connected to the remote contact of the scanning mode change-over switch 42. The input terminal 133 is adapted to receive the start preparatory signal. The input terminal 134 is connected to the stop switch 43'. The input terminal 135 is adapted to receive 1 signal when the scanning mode change-over switch 42 is brought into the scanning mode A or into the scanning mode B, that is, is adapted to receive 1 signal in case of the automatic scanning. The input terminals 136 and 137 are connected to the Y axis positive direction limit switch and to the Y axis negative direction limit switch, respectively. The input terminal 138 is adapted to receive the coincidence signal from the Y axis comparison circuit 38 which can deliver this coincidence signal when the stage 4 is moved in the Y direction for that distance which is preset by the Y axis preset switch 40. The input terminal 139 is adapted to receive 1 $\mu$ step stop signal delivered from the Y axis reversible counter circuit 34 which can deliver this 1 $\mu$ step stop signal every time the stage 4 is moved in the Y direction for 1 $\mu$.

The present Y axis output gate circuit 45 is provided with four output terminals 140 to 143. The output terminals 140, 141 and 142 are adapted to deliver the Y axis backward rotating signal, the forward rotating signal and the stop signal, respectively. The output terminal 143 is adapted to deliver the X axis start signal. The operation of the present Y axis output gate circuit will be clearly understood with reference to FIG. 7, so that further description thereof is omitted.

In FIG. 8 is shown one embodiment of the X axis motor driving circuit 44 and the Y axis motor driving circuit 46 shown in FIG. 4.

A conductor 150 is grounded and connected to the negative terminal of an electric supply source. Those circuit portions which are arranged above this conductor 150 constitute the X axis motor driving circuit 44 for controlling the X axis driving motor 20 which can drive the stage 4 in the X axis direction. Those circuit portions which are arranged below the conductor 150 constitute the Y axis motor driving circuit 46 for controlling the Y axis driving motor 21 which can drive the stage 4 in the Y axis direction. As seen from FIG. 8, the above mentioned two circuit portions are just the same each other and are symmetrically arranged with respect to the conductor 150. Thus, only the X axis motor driving circuit 44 with respect to the X axis driving motor 20 will hereinafter be described.

A conductor 151 is in common to all of the circuit elements shown in FIG. 8 and is connected to the positive terminal of the electric supply source. An input terminal 117' is the forward rotating input terminal, an input terminal 118' is the backward rotating input terminal, and an input terminal 121' is the stop input terminal. Terminals 152 and 153 are output terminals connected to the X axis driving motor 20. The forward rotating input terminal 117' is connected to the base of a transistor 160 whose collector is connected to the base of a transistor 161, the collector of which being connected to the base of a transistor 162. These transistors 160, 161 and 162 are connected across the conductors 150 and 151, respectively. The collector of the transistor 162 is connected to the base of a transistor 163 whose emitter is connected to the conductor 151 and collector is connected through a variable resistor 164 and a diode 165 to the grounded conductor 150.

The stop input terminal 121' is connected to the base of a transistor 166 and to the base of a transistor 167. The emitter of the transistor 166 is connected to the grounded conductor 150 and the collector of the transistor 166 is connected to a junction point a between the variable resistor 164 and the diode 165.

The backward rotating input terminal 118' is connected to the base of a transistor 168 whose collector is connected to the base of a transistor 169 having a collector connected to the base of a transistor 170. These transistors 168, 169 and 170 are connected across the conductors 150 and 151, respectively. The collector of the transistor 170 is connected to the base of a transistor 171 whose emitter is connected to the conductor 151 and collector is connected through a variable resistor 172 and a diode 173 to the grounded conductor 150. In parallel with this diode 173 is connected a transistor 174. The collector of the transistor 167 is connected to a junction point b between the variable resistor 172 and the diode 173 and the emitter of the transistor 167 is connected to the grounded conductor 150. In addition, the collector of the transistor 169 is connected to the base of a transistor 175 whose collector is connected to the junction point a. The junction point a is connected to one of the output terminals, that is, to the output terminal 152 and the junction point b is connected to the other output terminal 153.

Now, the operation of the X axis motor driving circuit 44 shown in FIG. 8 will be described with reference to signal waves shown in FIG. 9. Consider that the stage 4 is driven along the zigzag path as described above with reference to FIG. 1a. In addition, in the Y axis motor driving circuit 46 arranged below the grounded conductor 150 shown in FIG. 8, the Y axis forward rotating input terminal is designated by 142', the Y axis backward rotating input terminal is designated by 140' and the Y axis stop input terminal is designated by 141'. In FIG. 9 are shown the X axis and Y axis driving inputs signal wave forms.

At a time $t_0$ in FIG. 9, the X axis forward rotating signal is supplied from the output terminal 117 of the X axis output gate circuit 43 to the X axis forward rotating input terminal 117' to make the transistors 160, 161, 162, 163 and 174 conductive. As a result, a current flows from the positive potential conductor 151 through the transistor 163, variable resistor 164, junction point a, output terminal 152, X axis driving motor 20, output terminal 153, junction point b, transistor 174 to the grounded conductor 150, thereby forward rotating the X axis driving motor 20. In this case, the current flowing the X axis driving motor 20 and hence the rotating speed of the motor 20 can simply be adjusted with the aid of the variable resistor 164. Since the Y axis forward rotating signal is not supplied to the Y axis forward rotating input terminal 142', the Y axis driving motor 21 is not rotated. As seen from the above, the stage 4 can be driven in the X direction only.

At a time $t_1$ in FIG. 9, if the stage 4 has been moved in the X direction for $X_0$, the forward rotating input becomes extinguished to deenergize the X axis driving motor 20. At the same time, the stop signal is supplied to the X axis stop input terminal 121' to make the transistors 166 and 167 conductive. In this case, the counter electromotive force produced when the X axis driving motor 20 is deenergized appears at the terminal 152 as a positive polarity and appears at the terminal 153 as a negative polarity. The terminal 152 is shortcircuited through the junction point $a$, transistor 166, conductor 150, diode 173 and junction point $b$ to the terminal 153, and as a result, the counter electromotive force produced across the terminals 152 and 153 is instantaneously eliminated. Thus, the X axis driving motor 20 acts in the same manner as a generator having an infinitely heavy load and is instantaneously stopped.

At the time $t_1$, the Y axis forward rotating signal is supplied from the output terminal 141 of the Y axis output gate circuit 45 to the forward rotating input terminal 141' and the Y axis stop input supplied to the Y axis stop input terminal 142' becomes eliminated. As a result, the Y axis driving motor 21 is forward rotated to move the stage 4 in the Y axis direction. At the time $t_2$, if the stage 4 has been moved for 1 $\mu$, the Y axis forward rotating signal becomes extinguished and the Y axis stop input is supplied to the terminal 142', thereby instantaneously stopping the Y axis driving motor 21 in the same manner as in the case of stopping the X axis driving motor 20. The rotating speed of the motor 21 can simply be adjusted with the aid of a variable resistor corresponding to the variable resistor 164.

In the time $t_2$, the Y axis stop signal of the Y axis motor driving circuit 46 becomes extinguished and the backward rotating signal is supplied to the X axis backward rotating input terminal 118'. As a result, the transistors 168, 169, 170, 171 and 175 become conductive and a current flows from the conductor 151 through the transistor 171, variable resistor 172, junction point $b$, output terminal 153, X axis driving motor 20, output terminal 152, and transistor 175 to the grounded conductor 150. That is, the current flows through the X axis driving motor 20 in a direction opposite to that current which flows during the time $t_0$ to $t_1$, thereby backward rotating the X axis driving motor 20. As a result, the stage 4 is moved in a direction opposite to the above mentioned direction along the X axis.

At a time $t_3$, if the stage 4 has been moved in the opposite direction along the X axis for $X_0$, the X axis backward rotating signal becomes extinguished, thereby supplying the X axis stop signal. In this case also, the transistors 166 and 167 become conductive. Thus, the output terminal 153 is connected through the transistor 167, conductor 150, diode 165 and junction point $a$ to the output terminal 152, thereby shortcircuiting the output terminals 153 and 152. Thus, the counter electromotive force is produced when the X axis driving motor 20 is stopped, thereby instantaneously stopping the X axis driving motor 20.

Successive applications of inputs similar to the above mentioned inputs make it possible to accurately drive the stage 4 along the zigzag path as shown in FIG. 1a. In addition, if the Y axis backward rotating signal is applied to the Y axis backward rotating input terminal 140' of the Y axis motor driving circuit 46, the stage 4 can be moved in a direction opposite to the above mentioned direction, that is, in a negative direction along the Y axis.

In FIG. 10 is shown one embodiment of the recorder control circuit 49 shown in FIG. 4. The present recorder control circuit 49 is provided with five input terminals and two output terminals. In the present recorder control circuit 49, the recorder 13 is adapted to drive a recording sheet by means of a pulse motor which is energized by a driving pulse generated by the recorder control cirduit 49. To an input terminal 116' is supplied a scanning signal from the output terminal 116 of the X axis output gate circuit 43. This scanning signal is generated during the movements of the stage 5 in the positive and negative directions along the X axis in the scanning mode A shown in FIG. 1a and is generated during the movement of the stage 4 in the positive direction only along the X axis in the scanning mode B. To an input terminal 180 is supplied a recording pulse from the control signal generator circuit 30. This recording pulse is the same as the count pulse as described above. To an input terminal 92' is supplied a reset-stop signal from the output terminal 92 of the X axis control circuit 41. To an input terminal 181 is supplied a manual signal and to an input terminal 182 is supplied a remote signal. At an output terminal 183 is produced a signal for controlling a relay which can raise and lower a recording pen of the recorder 13. That is, if the scanning signal is supplied to the input terminal 116', a transistor 185 becomes conductive to supply a signal for lowering the recording pen of the recorder 13. If the scanning signal is extinguished, the transistor 185 becomes nonconductive to produce a signal for raising the recording pen of the recorder 13. At an output terminal 184 is produced a pulse for driving a pulse motor for feeding a record sheet of the recorder 13. The recording pulse supplied to the input terminal 180 is subjected to a shaping operation at a pulse shaping circuit 186. Provision is made of a counter 187 adapted to supply twenty recording pulses to the output terminal 184 after the scanning signal has been extinguished. Thus, the successive curves showing the amount of light absorbed by the specimen and plotted by the successive scannings at the recorder 13 are separated one from the other by 20 recording pulses, thereby facilitating observation of the wave forms. These twenty pulses correspond 10 mm in length on the recording sheet.

The invention is not limited to the embodiments described above, but many modifications thereof may be made. For example, in the above described embodiments use has been made of the encoder so as to detect the amount of movement of the stage. But, a linear scale may be used in place of the encoder. In addition, it is a matter of course that the above mentioned various circuit arrangements may be modified in accordance with any desired operations thereof. It is not always necessary to provide the light screening plate 7 and the solenoid 8 for the apparatus according to the invention.

What is claimed is:

1. A scanning and integration type microphotometric apparatus comprising an optical system essentially consisting of a light source, a spectroscope, a condenser lens, a stage on which is disposed a specimen and mounted movable in given directions, a driving means for driving said stage in the given directions, an objective lens, and a photoelectric converter for receiving incident light rays penetrated through the specimen and generating a corresponding electric signal output, an amplifier for amplifying the output from said photoelectric converter, an integrator for integrating the output from said amplifier and obtaining the amount of light absorbed by the specimen, a recorder receiving the output from the output from said amplifier and recording a light absorptivity curve plotted at each light spot scanning on a record sheet, an adder adding the output from said integrator to obtain the total amount of light absorbed by the overall specimen, a printer receiving the outputs from said integrator and from said adder and printing the amount of light absorbed by the specimen and the total amount of light absorbed by the overall specimen, respectively, an indicator receiving the outputs from said integrator and from said adder and indicating the amount of light absorbed by the specimen and the total amount of light absorbed by the overall specimen, respectively, and a control circuit interconnecting said driving means, integrator, recorder, adder, printer and indicator to control all of these devices in operative relationship with each other.

2. An automatic driving and control circuit for a microscope stage mounted movably in X and Y directions, comprising a pair of driving means for moving said stage 4 in the X and Y directions, respectively;

a detector including an encoder operatively connected to said driving means and for detecting the amount of movement of said stage and delivering a digital signal corresponding to the amount of movement of said stage;

a preset means including a preset switch for presetting a predetermined amount of movement of said stage with numerical values;

a comparision means connected to both the outputs of said detector and preset means and for comparing the digital signal supplied from said detector with the numerical values preset by said preset means and delivering a coincidence signal when the digital signal supplied from said detector is coincident with the numerical values present by said preset means; and a control means connected to the output of said comparison means and for receiving the coincidence signal from said comparision means and forwardly, backwardly moving one of said driving means while stopping the other driving means, whereby the amount of light absorbed by a specimen disposed on the stage is automatically measured in an accurate manner.

3. An automatic driving and control circuit for a microscope stage mounted movably in the X and Y directions as claimed in claim 2, wherein said control means comprises a control circuit connected to the output of said comparison means and for generating a forwardly rotating signal, backwardly rotating signal with respect to one of said driving means while generating a stop signal with respect to the other driving means in accordance with a light spot scanning mode;

an output gate circuit connected to the output of said control circuit and for generating a forwardly rotating signal and backwardly rotating signal with respect to one of said driving means while generating a stop signal with respect to the other driving means and generating an integrated sampling signal;

a circuit for driving said driving means connected to the output of said output gate circuit and for driving one of said driving means in forward and backward directions while stopping the other driving means; and a recorder control circuit connected to the output of a control signal generator circuit and delivering a pulse for driving a pulse motor for feeding a record sheet and a signal for controlling a relay for raising and lowering a recording pen, said pulse motor, relay and recording pen being included in a recorder.

* * * * *